United States Patent [19]

Garcia de Osuna et al.

[11] Patent Number: 4,746,233

[45] Date of Patent: May 24, 1988

[54] AUTOMATIC PRINTING APPARATUS UTILIZING TURNAROUND DOCUMENT

[75] Inventors: Ignacio B. Garcia de Osuna, Miami; Bernard Parker, Key Biscayne; Warren C. Winter, Hollywood; Terry L. Siorek, Plantation; Rafael E. Zorrilla, Cooper City; Edward N. Doty, Pompano Beach, all of Fla.; Hari Matsuda, Evanston, Ill.

[73] Assignee: Coulter Electronics, Inc., Hialeah, Fla.

[21] Appl. No.: 898,465

[22] Filed: Aug. 20, 1986

[51] Int. Cl.⁴ .............................................. B41J 3/50
[52] U.S. Cl. ....................................... 400/73; 101/66; 101/287; 400/105; 400/625; 271/2; 414/52
[58] Field of Search ................. 101/288, 66, 69, 2, 101/287; 271/2; 414/51, 53, 54, 62; 400/73, 103–105, 624–625

[56] References Cited

U.S. PATENT DOCUMENTS

| | | | |
|---|---|---|---|
| 3,641,931 | 2/1972 | Hickox et al. | 101/2 |
| 3,656,473 | 4/1972 | Sodickson et al. | 101/288 |
| 3,988,571 | 10/1976 | Blair et al. | 101/2 |
| 4,040,345 | 8/1977 | Adams et al. | 101/66 |
| 4,068,213 | 1/1978 | Nakamura et al. | 400/105 |
| 4,381,705 | 5/1983 | Roes et al. | 101/66 |
| 4,488,610 | 12/1984 | Yankloski | 101/2 |
| 4,529,187 | 7/1985 | Einem et al. | 271/10 |
| 4,540,106 | 9/1985 | Fakatsu | 271/2 |
| 4,561,352 | 12/1985 | Svyatsky et al. | 101/2 |
| 4,574,692 | 3/1986 | Wahli | 101/2 |
| 4,589,143 | 5/1986 | Baur et al. | 400/73 |

Primary Examiner—William Pieprz
Attorney, Agent, or Firm—Carl Fissell, Jr.; Gerald R. Hibnick

[57] ABSTRACT

Automatic printing apparatus wherein a single turnaround item-document is utilized as an initial source of intelligible information-data and thereafter by comparing certain of the data on the document with additional data inputted thereto by means of operably associated external hardware and subsequently summarizing the total data on the item effective to provide a final document including both the initially inputted information-data as well as the data resulting from the comparison and summarization.

13 Claims, 9 Drawing Sheets

FIG - 1 -

AUTOMATIC PRINTING APPARATUS UTILIZING TURNAROUND DOCUMENT

BACKGROUND OF THE INVENTION

1. Field of the Invention

The present invention generally relates to printing apparatus and, more specifically, to printing apparatus wherein an intelligible, indicia bearing document is employed both as an initial information source and subsequent to data update processing as a final information repository, i.e., turnaround document.

2. Description of the Prior Art

Printing apparatus which is capable of storing and forwarding data via a built-in electronic memory is well known. Also well known are printers which employ data seeking and reading capability. Many ticket printers, for example, utilize accessible memory in order to provide a variety of repeatably used data without the necessity or requirement for information overlays, unusual data formats, etc.

None of the known prior art devices, including those above mentioned, utilize a so-called turnaround document, i.e., a data bearing instrument, which is intially employed to identify and accumulate individual information-data and thereafter is reemployed as a final repository for additional data derived from a source other than the turnaround document itself.

SUMMARY OF THE INVENTION

The present invention although initially described with respect to medical technology is not, in fact, so limited. The apparatus embodying the present invention is useful in any field of endeavor in which a so-called turnaround document is or may be employed or required.

In the field of medical practice, whether in a hospital, medical laboratory, or physician's office, it is common practice to obtain samples of a patient's body fluids, for example, blood, urine, sputum, etc. Such samples are useful in medical diagnostics and form the basis for prognosis and ultimate treatment of disease. While each practioner or medical unit may employ an identification technique which is specific to that individual or unit, still accurate identification and matching of sample and patient is an absolute necessity and an essential for purposes of prognosis and treatment.

To this end, therefore, each sample, according to the present invention, bears an indicia of origin and in addition often includes the date/time/place of the sample extraction or derivation. Since the origin is human, an individual name, address, doctor's name, sample identification, i.e., blood, urine, etc., is incorporated in the data derived at the time of extraction.

While many different record keeping formats are available to the practioner for accumulating patient data, one of the most modern and efficient methodologies to date is the present technique which proposes the utilization of a multi-part request ticket, i.e., turnaround document, for patient sample data retention. In order to avoid the costly and time consuming tasks involved with human record generating, searching, and writing, the turnaround document utilizes means for automatically interrogating and identifying each individual patient document and simultaneously matching the patient sample with the document without human intervention. In order to further this technique, at the time of sample extraction or immediately thereafter, a bar code label is affixed to the turnaround document and to the sample. Thereafter, although the sample and documentation may, and often do, become separated, at the time the data is desired or required to be utilized, a match of the two is performed automatically by means of a bar code reader. An immediate comparison of the bar code scan data and the I.D. data previously stored in the document processing apparatus is automatically made. A match of the sample label data with the I.D. data causes the operably associated hardware to print an accumulated record of the data derived from the matched sample thereby assuring a rapid, accurate, automatically updated recording of essential information.

Printer apparatus embodying the present invention comprises a desk-top, stand-alone, intelligent hopper printer utilizing a so-called turnaround document in the form of a multi-part "ticket". The ticket bears a bar code readable label and includes personal identification indicia characteristic of the individual named thereon. The printer of the present invention is capable of storing individual sets of data and includes a bar code reader for scanning each ticket label. Assuming the data on the label matches the data stored in the memory of the printer, the data is printed on the form or ticket. If there is no match between the two, the form is rejected. The printer is operable both in a stand-alone mode and as an output device for an operably associated terminal to which it may be coupled.

The printer apparatus includes a receiving hopper in the form of a two-part container or drawer in which to collect the forms as they are ejected from the apparatus. An automatic mechanism moves the drawer from a printed form collection to a blank form position (or forms that exceed predetermined limits). The printer can be configured to operate without the bar code reader in which case it will print whatever input data is fed thereto from whatever source. The stored data in the printer memory previously received from some other operably associated input device, e.g., blood sample analyzer, can be recalled, for printing, using the individual's I.D. number or a lab number, without the necessity for a data terminal.

Other and additional options, features, and capabilities will be described in more detail in the description of the preferred embodiment which follows hereinafter.

DESCRIPTION OF THE PREFERRED EMBODIMENT

1. CONTROLS

Figure 1:
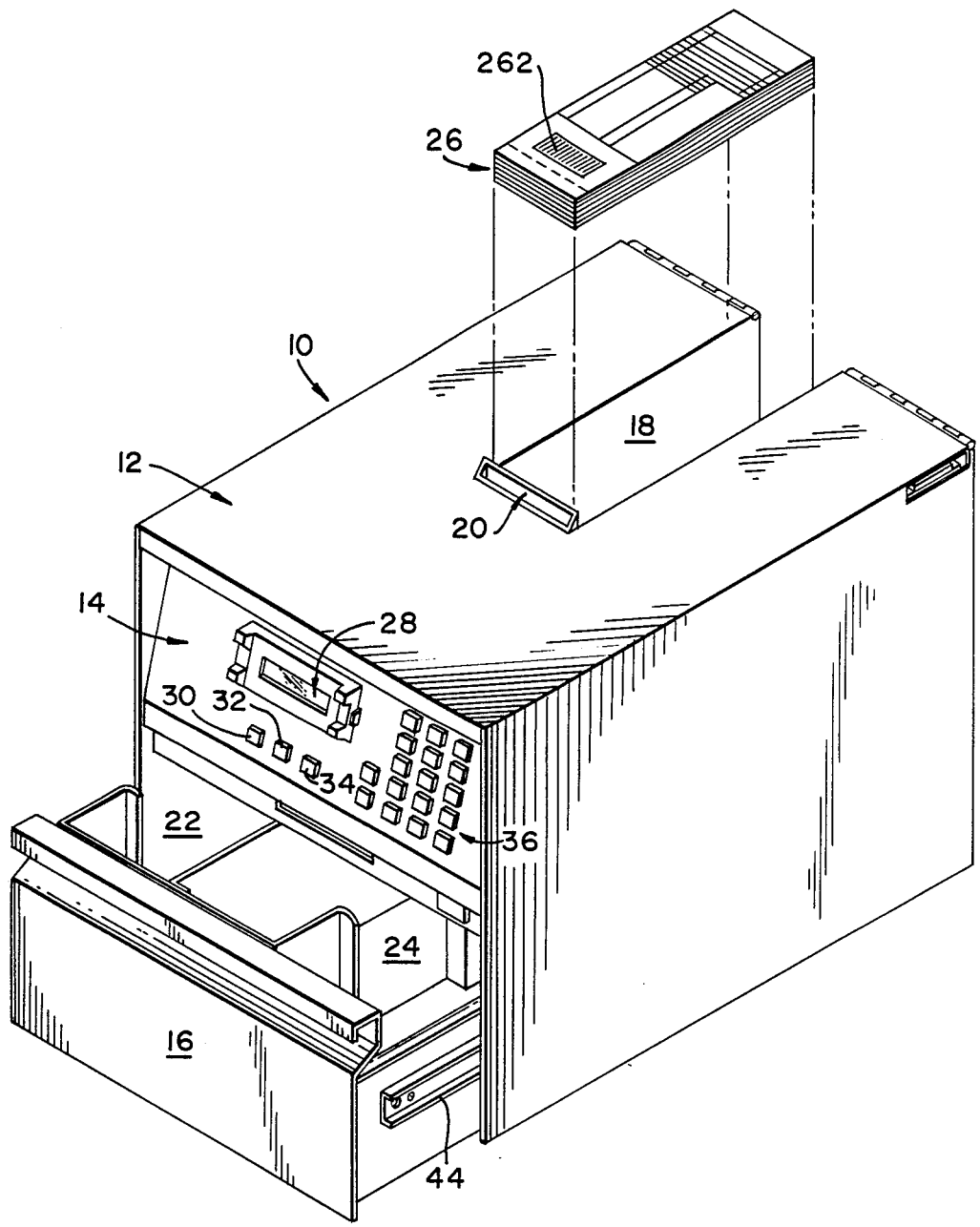
FIG. 1 is an isometric view (not to scale) of the preferred embodiment of the present invention.

As viewed in the isometric drawing of FIG. 1, an intelligent printer apparatus embodying the present invention comprises a rectangular, box-like structure 10 including a hinged top enclosure or lid 12, a rockably movable, drop down front control panel 14, and a forwardly and rearwardly movable drawer or output hopper 16. The top portion of the mainframe structure 10 further includes a rearwardly extending, rectangular item input receptacle 18 opening outwardly at the rear (rightwardly FIG. 1). The bottom or floor of the open receptacle 18 is angled forwardly-downwardly toward the front (leftwardly FIG. 1) of the printer. Contiguous with the front wall of the receptacle 18 is vertically-downwardly oriented, manual item input hopper slot 20. The purpose of the openings 18 and 20 will become clear as the description proceeds. It is noted that drawer 16 is compartmented, as shown, into two parallel receptacle bins 22 and 24 and is adapted to move back and forth, from side to side, to selectively receive either "accepted" or "rejected" items 26, as will be described later on herein.

The front panel 14 is seen to include, at the top center, a visible display 28 which may take the form of a liquid crystal alpha-numeric display assembly. Immediately below the display assembly 28 are located three pushbutton switches 30, 32, and 34 Providing auto-manual control, form feed control, and on-off line control, respectively, all to be described in due order. To the far right of the front panel 14 are located a bank or set of 17 pushbutton switches not otherwise identified, providing a variety of different control functions. Switches labeled 1-0 (FIG. 2) inclusive, form a keypad assembly 36 for entry of numeric data into the printer, for example, I.D. numbers or lab numbers. The "diamond-" key is used as a "dash" with the I.D. number and as a "decimal point" with the lab number. The CE key (clear entry) is used to delete erroneous key entries and to step through "menus" such as sort options and special tests. The F (function) key permits the operator to perform special functions listed hereinafter. The I.D. key is used to enter and print any desired data stored in the printer memory under a specific I.D. number. The "lab" number key is used to enter and print any desired data stored in the printer memory under a specific lab number. The E/P "enter and print" key is used in the "off-line" mode only. The remaining key functions will be described as the detailed explanation of the hardware operation proceeds.

2. EXTERNAL STRUCTURAL CONFIGURATION

Figure 2:
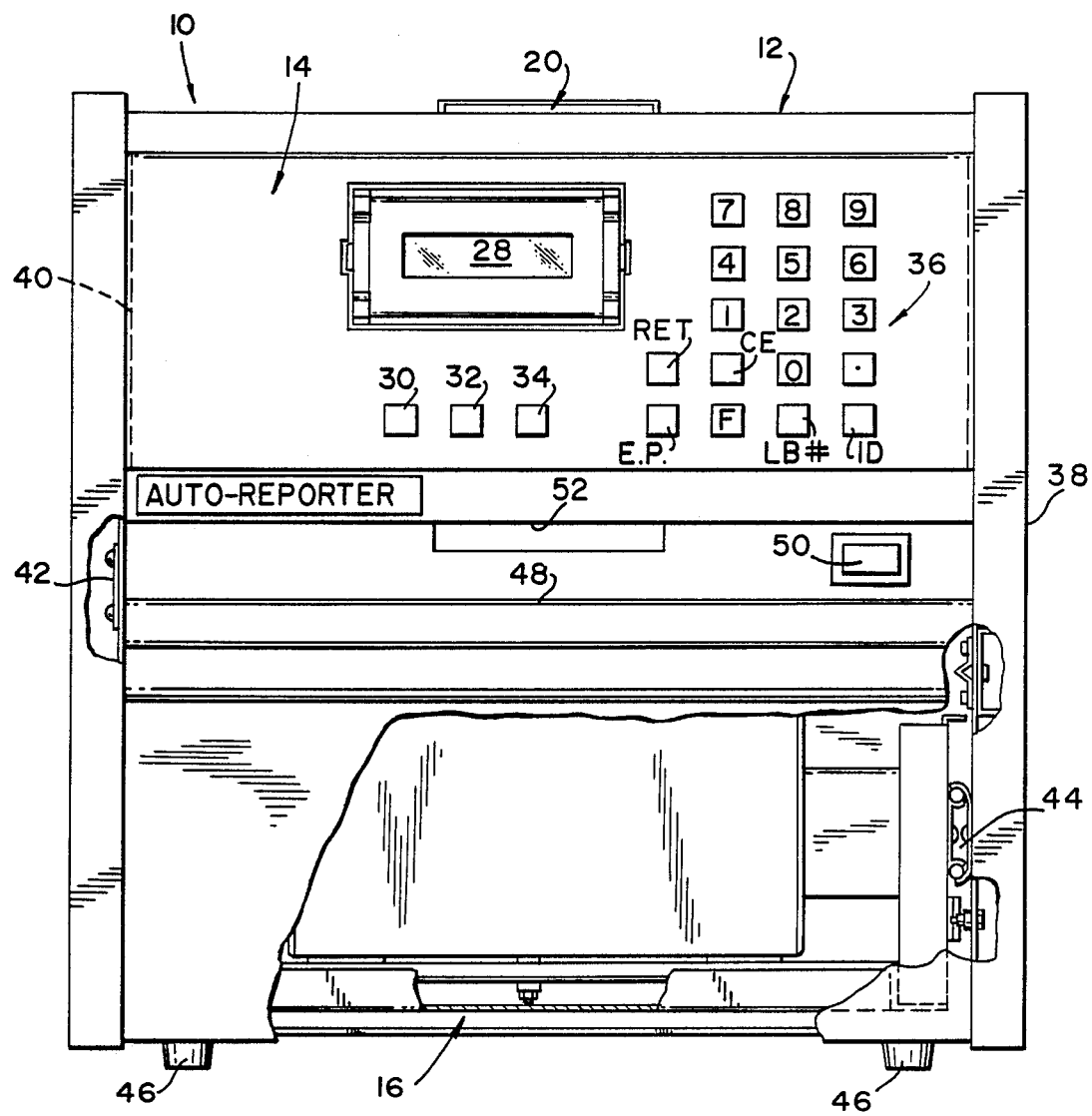
FIG. 2 is a front-elevational view of the printer apparatus of the present invention.

In FIG. 2 (the front elevation), it is noted that the printer apparatus generally is contained and supported within, for example, a J-shaped outer frame member 38. The leftward side of the structure is the shorter side of the J-outline configuration. The upper leftward half portion 40 is hinged as at 42, so as to be movable arcuately, outwardly, and downwardly to expose the side of the apparatus to view for service and/or repair, as necessary. The drawer assembly 16 is, as earlier mentioned, movable inwardly and outwardly for operator access to the contents thereof. Oppositely disposed drawer slides 44 permit easy withdrawal of the drawer from the base of the printer apparatus. Rubber stand-offs 46, at the bottom four corners of the apparatus, permit the printer to be desk-top mounted without damage to the supporting surface. The mechanism to move the drawer interior-pocket receptacles from side to side (not seen in this figure) will be described later on. It is noted, however, that drawer 16 is a unitary, modular, demountable assembly which will become clear as the description proceeds. The front panel 14 is, as before mentioned, hinged at the base 48 permitting easy access to the interior front of the device. An "on-off" light 50 indicates to the operator the status of the apparatus. A front item eject aperture 52, at the lower mid-section of the front panel 14, permits automatic ejection of each item 26 into a receiving receptacle or, as will be described shortly, into the selected bin portion (right or left) of the lower drawer assembly 16.

3. ITEM HOPPER/TRANSPORT ASSEMBLY

Figure 3:
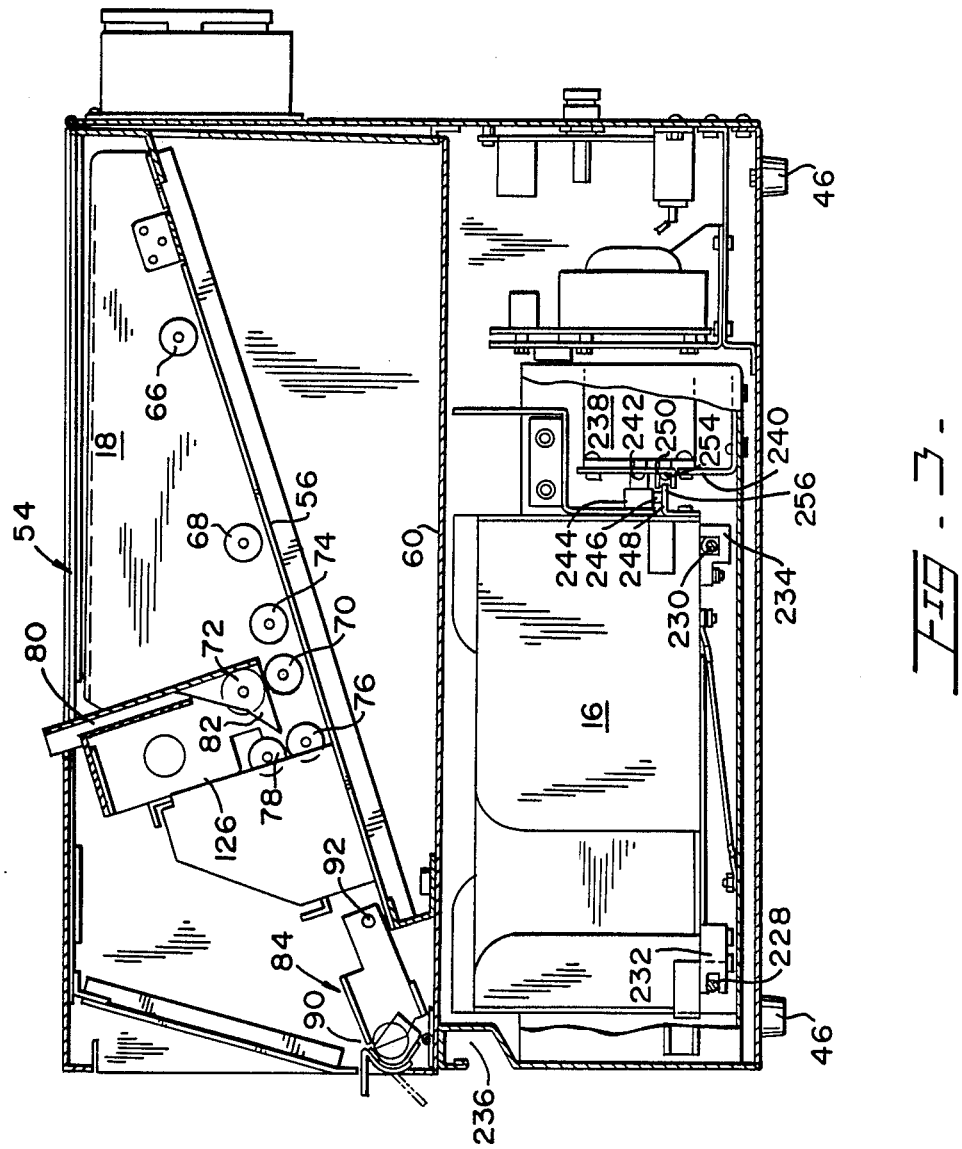
FIG. 3 is a side-elevational, cut-away view of a portion of the apparatus of FIG. 1, including the lower item receiving hopper drawer.

In FIG. 3, is shown the "turnaround item" document transport assembly 54. In order to provide ease of access to the operator for loading items 26 (FIG. 1) into the printer, the modular item transport assembly 54 is mounted at a downwardly angled attitude with the slanted auto-load input hopper 18 slightly to the rear of the assembly. Immediately forward of input hopper 18 and contiguous with the front wall thereof is the vertically oriented, input item manual hopper receiving throat or slot 20, previously referred to, for manually feeding items to be printed into the printer.

Figure 5:
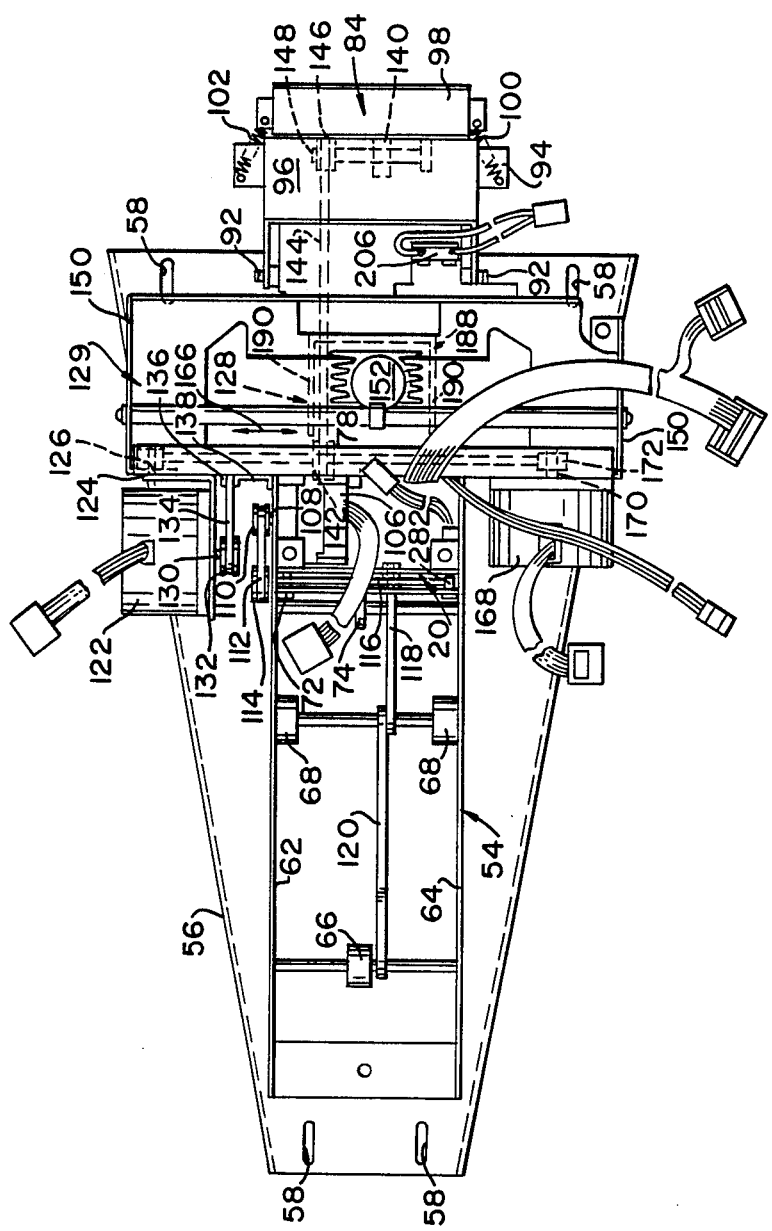
FIG. 5 is a top plan view of the item handling-printing mechanism of the present invention.

As seen most clearly in the top plan view of FIG. 5, the item transport assembly 54 is mounted to a wedge-shaped support plate or base member 56 provided with mounting slots 58 at each opposite end. Member 56 is secured, as by bolts through slots 58, to a flat rectangular, rigid, planar support member 60 (FIG. 3) disposed intermediate the top and bottom of the printer assembly 10 and effectively forming a separator member between the item-document transport assembly 54 and demountable drawer assembly 16 disposed therebelow (FIG. 3).

The item transport assembly 54, per se, as seen in FIG. 5, comprises a pair of oppositely disposed, vertical, parallel side walls 62-64 bolted to wedge plate 56 and extending forwardly (from front to back) of the structure 10 (FIG. 1). Three pairs of coaxially aligned friction surfaced driving rollers 66, 68, and 70 (FIG. 3) are arranged within and between side walls 62-64 so as to form a "false bottom" for the stack of item-documents 26 to rest upon when loaded by the operator into the hopper. A fourth pair of coaxial idler rollers 72 (FIG. 3) is disposed immediately above and slightly separated from roller pair 70, for purposes to be described shortly. A single, centrally disposed idler roller 74 provides additional support for the stack of items to be fed and printed. Forwardly (leftwardly in FIG. 3) of rollers 70 is located a front driving roller 76 (FIG. 3) cantilever mounted to an angled lip (not shown), bent rearwardly out of the main plane of the support structure. A pressure roller 78, in frictional surface contact with roller 76, affords sufficient driving contact pressure to assure a good drive for each item 26. Only pressure roller 78 is shown in FIG. 5 for reasons of clarity.

4. MANUAL ITEM INPUT HOPPER

The manual input hopper 20 is illustrated in the side-elevational view of FIG. 3 substantially centrally disposed within the transport assembly 54. So as to enable the ticket item 26 to move and be transported within the assembly (leftwardly FIG. 3) toward the front of the printer, the parallel vertical side walls 80 of the hopper 20 are curved arcuately, forwardly, as at 82, at their lower extremities. This curved construction forces the leading edge of the entering item to bend or bow so as to force the ticket 26 into the nip of rollers 76–78. The ticket-item can then be driven forwardly for purposes to be explained presently.

During operation of the apparatus, when the item 26 (ticket) is fed from the manual hopper 20, the bottom of the hopper due to the arcuate shape and the bowing or bending causes the ticket material to "remember" the curvature. This causes the top of form switch 206, still to be described. to activate earlier (higher) than it otherwise would when the item 26 comes from the input hopper 18. This difference changes the number of form position steps as will be described under the heading "12. OPERATION".

5. ITEM TURNAROUND MECHANISM

Figure 8:
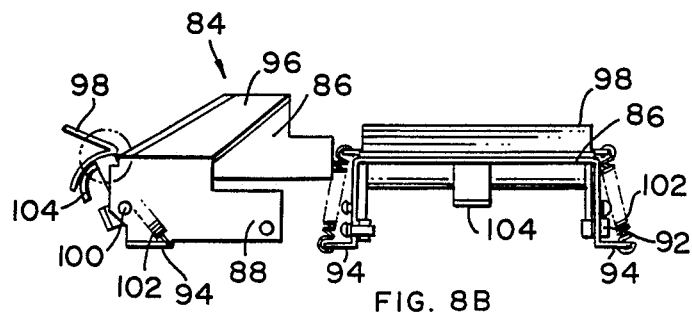
FIG. 8 is a detail view of the item turnaround mechanism of the apparatus of FIG. 1, as illustrated in FIGS. 8A and 8B, respectively.

The extreme forward (leftward FIG. 3) end of the transport assembly 54 is provided with a novel item turnaround mechanism 84 (FIG. 8). Mechanism 84 comprises a C-shaped rigid member 86 including integral rearwardly extending pivot mounts 88 for attachment to the front portion 90 of the printer assembly as by bolts 92 and oppositely disposed bent tangs 94 at each forward side edge thereof. The upper flat portion 96 of mechanism 84 provides a guiding surface for each exiting item document 26 as the document leaves the transport hopper. Pivotly secured to the leftward outer edge of turnaround 84 is a V-shaped member 98 (FIG. 8). Member 98 is mounted onto a pivot mount 100 (FIG. 8) and is spring biased by oppositely disposed springs 102 attached at one end to the V-member 98 and at each opposite end to respective outboard tangs 94. This arrangement effectively provides an "over-under" tensioning arrangement for member 98. The radially curved member 104, integral with the pivot mount 100, acts as a curvilinear guide for each item-document 26 when the member 98 is pivoted by the operator from a full "up" position to a full "down" position, as will be described later on herein.

6. PRINTER DRIVE MECHANISMS

Drive means, now to be described, for the present invention comprises three separate drive motors, each one of which performs a separate, independent function, although each is electrically controlled and coordinated in its operation with the others by means of the electrical controls and software of the apparatus.

The auto-load hopper 18 is provided with a hopper drive motor 106 (FIG. 5) which is secured to side wall 62 of the item hopper with its driving shaft 108 extending outwardly therefrom and carrying a notched drive pulley 110 thereon. A notched or cleated drive belt 112 transmits rotative torque from pulley 110 to input pulley 114, the latter being secured to cross shaft 116 carrying rollers 70 (FIGS. 3 and 5). Drive belt 118 from cross shaft 116 drivingly rotates rollers 68 while drive belt 120 similarly rotates single roller 66. The single central roller 74, as before mentioned, acts as a nondriven idler pulley.

Item feed motor 122 is mounted on an outboard hanger bracket 124 secured to the cross member 126 of a reader printer assembly 128, which will be described in due course later on herein. The output shaft 130, of feed motor 122, carries a pulley 132. Drive belt 134 drivingly transmits rotative torque from motor 122 to input pulley 136 on cross shaft 138 so as to rotate item output drive roller 76 (FIG. 3) in contact with item pressure roller 78 (FIG. 5), for purposes to be explained presently. Driving connection between driven friction roller 76 (FIG. 3) and outboard driven roller 140 at item turnaround mechanism 84 (FIGS. 3, 5, and 8) is via pulley 142 on shaft 138, belt 144 and outboard pulley 146 on front stub shaft 148. A third drive motor will be discussed later on herein.

7. READER-PRINTER ASSEMBLY

Figure 6:
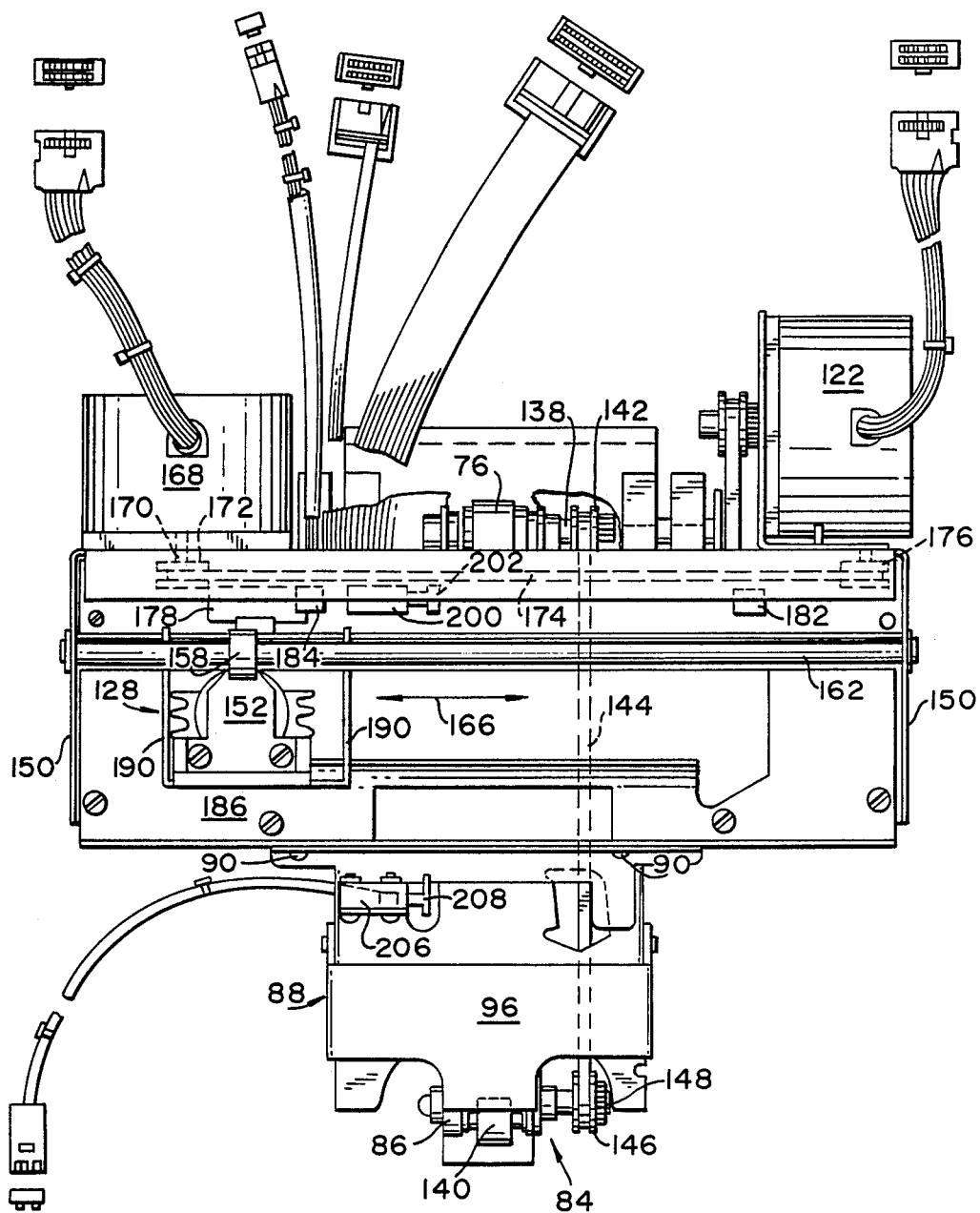
FIG. 6 is a top plan view of the front portion of the printer apparatus illustrating the reading-printing area.
Figure 7:
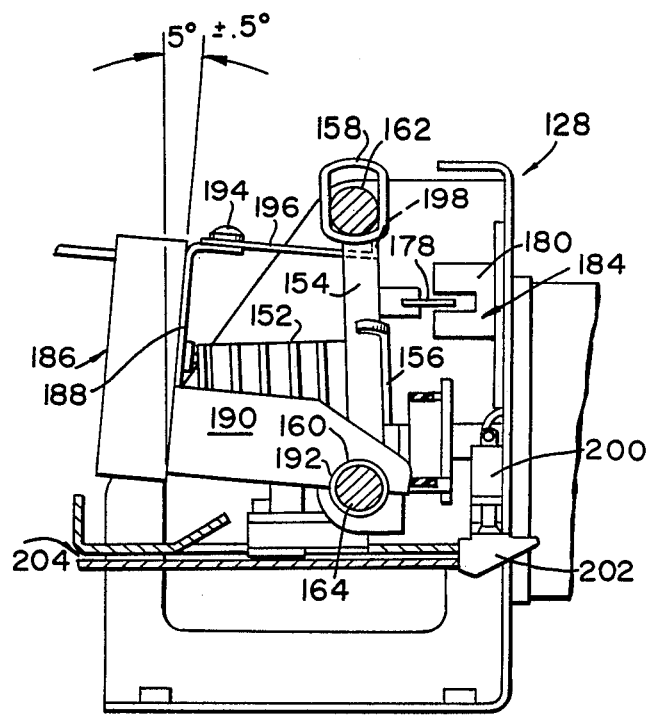
FIG. 7 is a side view of the movable bar code reader and printer assembly of the present invention.

The present apparatus includes means both for reading intelligible data from the item-documents 26 as well as means for printing intelligible data onto the documents. Disposed between opposite, parallel, rigid side wall members 150-150 (FIGS. 5 and 6), is the previously, briefly referred to reader-printer assembly 128 (FIGS. 5 and 7). Assembly 128, as shown, most clearly in FIG. 7, but also partially in FIG. 6, comprises a printer head 152, including, but not illustrated herein, a multi-wire, electromagnetically actuated pin printing mechanism. The printer head 152 is attached to a vertically disposed support member 154 (FIG. 7) by means of a spring biased lever 156. An upper, integral loop 158 and a lower, integral cylindrical bushing 160 on member 154 secure the print head assembly 152 for horizontal, slidable movement back and forth along upper and lower guide rails or rods 162 and 164, respectively. The assembly 152 is adapted to be moved at right angles to the item document pathway in the direction of the two headed arrow 166 (FIG. 5). A printer-reader head drive motor 168 (the third motor previously referred to herein) is mounted to the rear wall of the cross member 126. The drive shaft 170 of motor 168 (FIG. 6) extends outwardly therefrom and carries a drive pulley 172 drivingly engaging a loop notched belt 174. Belt 174 is secured to the rear of the printer-head member 154 of the assembly 152 (FIG. 7). A fixed pulley 176 secured to the opposite side of the frame 126 carries the opposite end of the loop belt 174. Rotative torque from motor 168 to pulley 172 moves the head from side to side. The rear vertical portion of the head rail mounting structure 154 (FIG. 7) is provided with a sensor tang or tab 178, which projects outwardly from the rear of member 154 and is adapted to pass between the parallel fingers or tangs of a right and left side position sensor-monitor 182 or 184, as will be explained presently.

8. BAR CODE SCANNER-READER

Since the subject printing apparatus is adapted to operate in different modes and for different though generally related purposes, a universal bar code scanner-reader 186 (FIG. 7) is utilized herein. For simple, easy, and quick mounting and dismounting of scanner 186 a U-shaped bracket 188 (FIG. 7) is secured to the rear of the scanner 186. The lower forwardly extending parallel arms 190 of bracket 188 (FIGS. 5 and 7) are radially notched or cut as at 192 so as to be received over opposite ends of the circular, horizontal mounting bushing 160 on opposite sides of the printer head assembly 152. The upper, integral portion of the bracket 188 is bent outwardly-forwardly and has secured thereto, as by bolts 194, a triangularly shaped spring steel projection or tab 196, the outward terminal portion 198 of which is bent vertically-upwardly for press fit behind the upper head support ring 158 within a notch or cutout (not shown) enabling the scanner-reader assembly to be "snap-mounted" onto the two rails or rods 162 and 164. Dismounting thereof is simple and easy. Finger pressure downwardly against the spring steel 196 will dislodge the complete reader-scanner assembly for easy and efficient removal. A hopper sensor switch 200 (FIG. 7) secured behind the printer head assembly 152 has its triangularly shaped actuator 202 disposed within the item-document pathway 204 so as to intercept each item as it passes therethrough. A top of form switch 206 (FIG. 5) is secured to the upper portion of the forward end of the printer assembly 128 with its actuator 208 (FIG. 6) depending into the item pathway, for purposes still to be explained.

9. MOVABLE DRAWER ASSEMBLY

Figure 4:
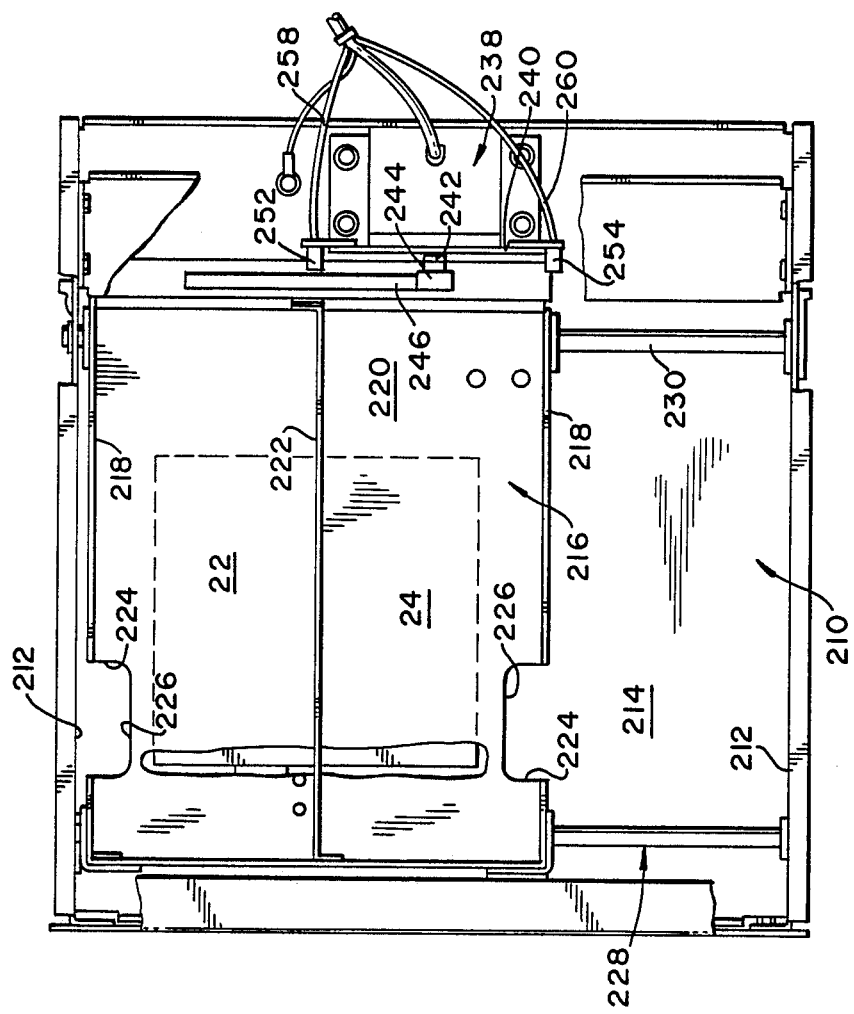
FIG. 4 is a top plan view of the lower drawer assembly of the invention.

As earlier mentioned herein, the present printer apparatus includes means for automatically sorting "accepted" item-documents 26 from "rejected" item-documents. Illustrated in the top plan view of FIG. 4 and the side elevation view of FIG. 3 (lower portion of the drawing) is the item drawer assembly 16. The drawer assembly 16, comprises a first, lower, substantially square, shallow, box-like member 210 having vertical side walls 212 and a flat floor or bottom 214. Disposed within the member 210 is a second internal, upper, box-like member 216 provided with vertical side walls 218 and a floor or bottom enclosure 220. A rigid, vertically disposed, separator, wall member 222 divides the upper member 216 into two separate, but substantially equivalently sized, item-document receiving hoppers or bins 22 and 24, characterized as "accept bin" and "reject bin", respectively. Opposite side walls 218 are provided with enlarged cutouts 224, while the floor or bottom member 220 is similarly cut away as at 226 (FIG. 4). The cutaway areas provide access means for operator document handling as will become clear as the description goes forward.

Secured within the lower, box-like member 210 are two parallel, spaced apart support rods or rails 228 and 230 which extend horizontally into and through front and rear bearing blocks 232 and 234, (FIG. 3) respectively.

The front of the drawer assembly 16 (FIG. 3) is provided with a sheet metal wall member having an integral, formed indent 236 extending across the width of the structure and providing an operator handle for opening and closing the drawer. The drawer assembly is movable into and out of the base structure by means of the oppositely disposed drawer slides 44 earlier referred to and as seen most clearly in FIGS. 1 and 2. Mounting feet, for example, rubber standoffs 46 (FIG. 3), permit the printer assembly to be desk-top mounted for convenience and use.

As before mentioned, the internal hopper-bin assembly 22-24 is movable from side to side along the rails or rods 228-230 (FIGS. 3 and 4). Drive means providing this movement comprises an electrical drive motor 238 disposed on an L-shaped bracket 240 secured to the floor of the bin structure and extending vertically-upwardly therefrom. The forward end of the motor drive shaft 242 carries a drive pinion gear 244 engagable with a horizontally disposed rack member 246, the latter secured to a relatively wide bracket 248 extending across the rear wall member of the bin structure. Supported on bracket extensions 250 on opposite sides of the motor mounting bracket 240 are individual, left and right, U-shaped sensor members 252 and 254 (FIG. 4), respectively. As will be explained later on herein, the two left-right sensors are adapted to indicate the left-right termination of bin travel as the outer edge 256 of the horizontal bracket 248 passes through each sensor and interrupts the respective sensor beam. The two sensors 252 and 254 are interconnected over leads 258 and 260, respectively, to the electronic controls to be described shortly herein.

10. TURNAROUND DOCUMENT-TICKET

The item-document 26, utilized with the present invention, is described herein as a "turnaround document". The name is derived from the manner in which the document is employed with the present invention.

In a medical arts environment, for example, the "request ticket", i.e., turnaround document 26, is initially used to record the individual's name, room number (if in a hospital), and any other required or necessary data to identify that particular individual. A preprinted, adhesively backed, machine readable, bar code label 262 (FIGS. 1 and 9) is affixed to the "request ticket" in a prescribed area on the ticket while a duplicate bar code label is adhesively secured to any sample material extracted from the individual for testing. The two bar code labels 262 are substantially identical in format and may, for example, bear either an I.D. number or a lab number depending upon circumstances and the specific data sought to be recorded. A human readable number (not otherwise identified) is also employed with the bar code data.

The sample or samples gathered during "rounds" in a hospital setting are then taken to a laboratory for examination and testing. In those instances where automatic body fluid analyzers are in use, the samples are handled by means of automatic apparatus which derives its test results therefrom and thereafter forwards these results to the operably associated equipment, for example, a printer embodying the present invention. However, in certain circumstances, the printer may obtain its data from an intermediate source, for example, a data terminal. The data terminal (not shown) may include a facility for providing a printout which may include, for example, a histogram of whatever data, diagrams, etc., the test results are supposed to show. The printer, in any case, compares the bar code labels seeking to match the individual with his or her sample. When a match is made, the printer then prints out on the turnaround document 26 the test data provided by the analyzer from whatever source. The turnaround document 26 thus provides a two-fold purpose, as earlier described herein. As a final result, the data from multiple tickets can, and often is, collated into a continuous form printout from which billings can be made as well as direct comparisons with similarly situated individual results for diagnosis.

11. ELECTRONIC CONTROL

The present invention has been characterized as an auto-reporter printer. A built-in central processor within the printer apparatus, including sufficient memory storage facility, provides means to store and retrieve data from, for example, two hundred item-documents and to subsequently print out data inputted to the printer or any other data that has been stored in the printer memory.

Figure 9:
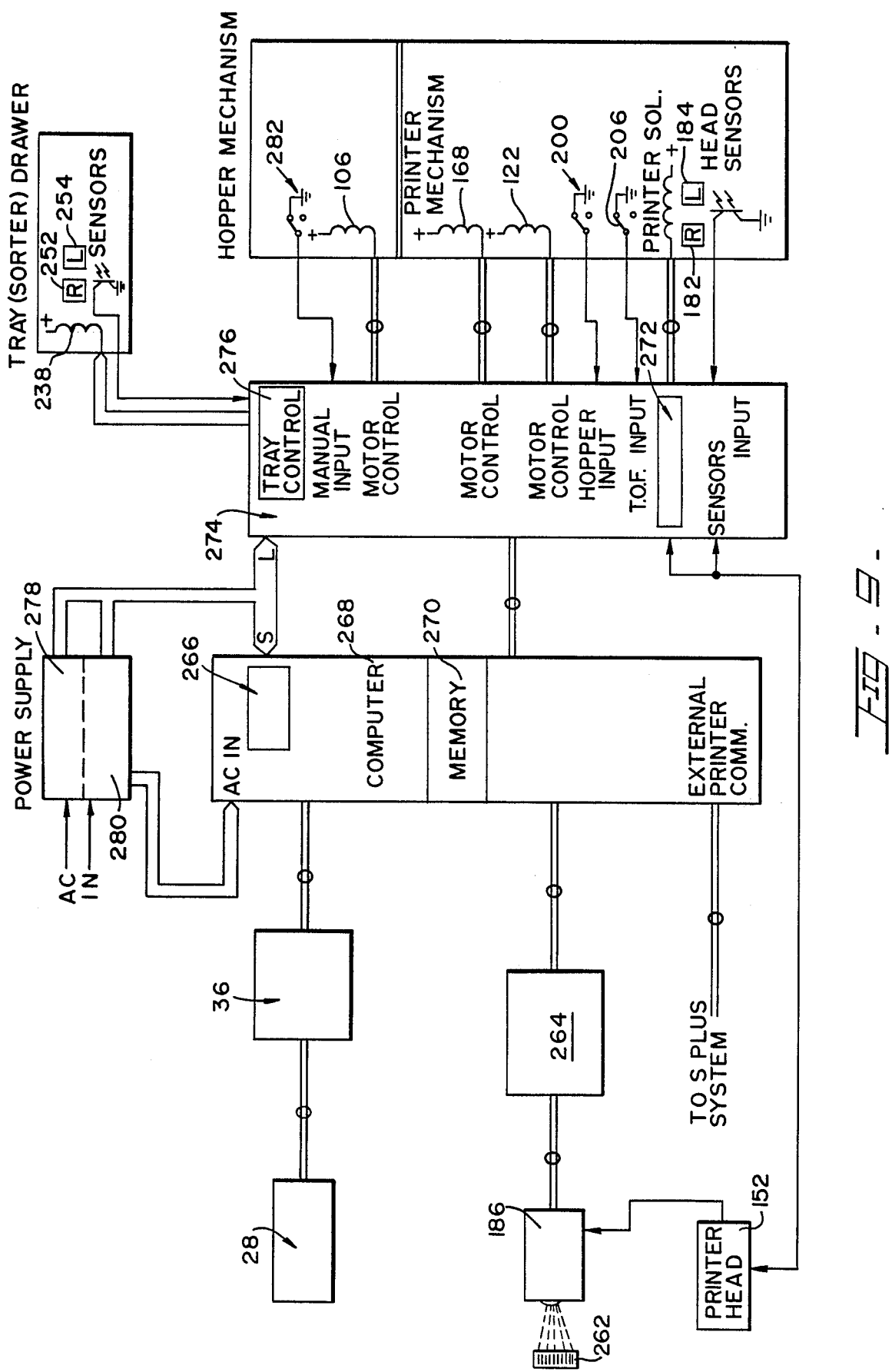
FIG. 9 is a block diagram of the electrical control circuitry employed with the present invention.

Referring now to the control circuit block diagram of FIG. 9, there is shown an overview of the essential printer controls for the present invention. Each of the labeled boxes of FIG. 9 is interconnected in a manner so as to indicate the present status or condition and printing of each "ticket" item 26 as indicated on the display 28 and/or otherwise controlled as to its final disposition as either "accepted" or "rejected". Where possible, the same reference characters have been used for the sample elements of the within described combination.

Reading from left to right (FIG. 9) there is illustrated a bar code label 262, which as earlier described, is disposed on the ticket item 26 (FIG. 1 at top right). The label 262 is adapted to be scanned, i.e., read, by the bar code reader-scanner member 186. The information-data scanned by member 186 is decoded by an operably associated automatic discriminator (not shown) of the electronic circuits of the bar code reader circuit board 264. The information from the member 264 is fed to the onboard printer controller board 266 which includes a built-in data-processor computer 268 and a memory 270. The electronics of the bar code reader circuit board 264 interprets the bar code just read and decodes its value. This value is compared with the value previously stored in the printer memory 270. If a corresponding value is found in memory, this value is fed to the printer head solenoids control 272 of driver circuit board 274. The data that corresponds to this value is then printed by the printhead 152 on the ticket 26. The actual printing of the data on the ticket is accomplished by a multi-pin wire printer assembly which prints vertically line-by-line with a ticket advance between each line. Since this latter operation is well known in the art, no detailed description thereof is made with the present specification.

12. OPERATION

(a) AUTOMATIC

As earlier mentioned herein, the present printer apparatus is capable of both "manual" as well as "automatic" operation in an attended or unattended mode as required or desired.

In the automatic mode of operation, with the item-document, i.e., tickets 26, loaded in the angled open hopper 18 (FIGS. 1 and 3), the printer is placed in the "on-line" or automatic mode. Hopper motor 106 and feed motor 122 (FIG. 5) are both energized and running. The hopper motor 106 driving item moving friction rollers 66, 68, and 70 moves the bottom most ticket 26 from the stacked pile of tickets to the front of the printer assembly. When the leading edge of the first ticket strikes and activates the hopper sensor switch 200 (FIGS. 6 and 9), the software of the printer acknowledges that the hopper switch has been activated and turns off the hopper motor 106. The feed motor 122, which is still running, continues to move the ticket still further forward in the printer until the leading edge of the ticket activates the top of form sensing switch 206 (FIGS. 6 and 9). At this moment, the software acknowledges that the switch has been activated, and the feed motor 122 advances the ticket 26 a predetermined number of steps to the top of form position. This position value, i.e., number of steps, is adjustable by the operator by means of the software of the apparatus. Any number of steps are available to adjust the form from printer to printer, so that the actual position of the top of the form can be located for correct printing. In the present instance, the ticket is now in position for printing thereon.

Once the ticket 26 is in position to be printed, it is likewise in a position for the bar code reader 186 to scan the bar code label 262 affixed thereon. The scanner 186 is now automatically moved by the head motor 168 (no printing is performed at this time). The bar code reader (scanner) is, as noted in FIG. 6, for example, mounted on the same carrier frame as the printer head 152 for mechanical convenience. The label 262 of the ticket 26, is now scanned horizontally. The bar code reader board 264, which includes a separate onboard computer (not shown), decodes the scanned information and informs the main computer 268 that there is a valid value on the label. The built-in discriminator (not shown) of member 264 enables this apparatus to distinguish between different types or kinds of bar codes, for example, interleaved 2 of 5, code 39, or codabar, depending upon the institutional requirements. Refer to ANSI MH1O.8M 1983, CPN 0216085, and AIM Publication CPN 0216086 for detailed description of each barcode type. If the value is a "good" value, i.e, a valid value, this data is passed on to the computer memory 270 for a comparison check. If a corresponding value is found in memory, the data corresponding to this value is then printed on the ticket 26.

The printer now prints on the first line of the ticket whatever data is reflected to it by the computer. The printhead motor 168 steps the printhead 152 across the ticket 26 at right angles to the long dimension thereof until the line is completed. The feed motor 122 advances the ticket to the next line and the printhead repeats its operation. Once the last line on the ticket 26 has been printed, the computer will indicate any abnormal value or "flag" with respect to this ticket. If there is abnormal data, this ticket will be sorted as a "reject" into the left side bin or hopper 22 of the drawer 16. The operator has sorting options using one of the printer built-in functions. If all the ticket data is normal, then the ticket is sorted as a "accepted" into the right side bin or hopper 24 of drawer 16. The tray (sorter) drawer motor 238 is enabled by the computer tray control circuit 276 to move the interior hopper bins 22-24 from side to side, as called for by the computer software "accept-reject" signals derived from the sort flag. The left-right drawer position sensors 252-254, respectively, signal the computer the drawer-bin position so that the sorting operation may continue automatically, without interruption.

In case of memory failure, e.g., a power interrupt or for other reason, the memory location fails in the computer at the momment that the printer receives the data from the data source, e.g., blood analyzer, the printer computer, etc., a "CRC" (cycle redundancy check) is computed. This is a redundant value unique to this data transmission. This value is saved by the memory 270 of the printer. When the printer prints this information on the ticket, the processor in the printer computer will compute this "CRC" again and compare the "CRC" computed with the one saved in memory. If the two agree, the data is printed on the ticket. If they do not agree, the ticket will be ejected "blank". In this case, only the headings are printed on the "blank" ticket. The headings include the date, the test number, the cassette number (sample), and the 1.D. number. These values will be printed on the ticket, and a message is also printed on the ticket stating that there was "memory failure".

(b) MANUAL OPERATION

In certain instances, it may be necessary or desirable to be able to have the printer operate manually. For example, if a ticket is already in the printing station being printed upon, when the operator inadvertantly places a ticket in the throat of the manual input hopper 20, a jam may occur. The printer feeding mechanism will attempt to feed the two tickets at one time. Without more, this action would obviously cause a jam of the two tickets. Before this happens, however, a manual switch 282 (FIG. 5) within the lower portion of the manual hopper 20 is actuated so as to alert the computer of the two ticket feed condition. The feed motor 122 is immediately stopped and an audible alarm is sounded. A message "remove ticket" is displayed at 28 to the operator. After the ticket is removed from the printer, printing can continue as before.

In the manual mode of operation, actuation of switch 282 indicates to the computer that a ticket is in the manual hopper. Also in the manual mode, when a ticket is fed into the manual hopper 20 it is arcuately bowed or bent by the curved portions (right and left) of the ticket turnaround members 82 (FIG. 3) so as to bring the leading edge of the ticket into the nip of rollers 76 and 78. At this point, assuming the ticket 26 is moving as prescribed, it will be fed by feed motor 122 to the first printing line, as before described. The hopper motor 106 is deactivated. As the printer head 152 is moved horizontally during printing of the ticket 26, the right-left position sensors 182-184, respectively, inform the control circuits of the head position and enable the head drive motor 168 to return the print head to the "home" or starting position at the termination of travel with respect to each line.

13. UNREADABLE BAR CODE LABEL

The next ticket 26 in the hopper stack is advanced by the hopper motor into the top of form position as before and the cycle previously described repeats. If the computer is unable to read the value on the label, for example, the label may be broken-incomplete, the label may be affixed in a cross-wise fashion rather than in its proper rectangular location or there may be food or liquid stains covering or obliterating the bar code which for all practical purposes prevents a positive identification of the specific data on the label or the label itself. In this case, the computer will acknowledge this condition and the ticket will be ejected blank into the left bin of drawer 16. The next ticket is advanced from the bottom of the stack. In this instance, although the bar code scanner reads the label without difficulty, the computer, however, cannot find the corresponding data in memory. A message is put on the display 28 "not found". Here the label was scanned correctly, but the corresponding data, for some reason, was not in the memory at this point. As previously described, the ticket is ejected blank to the left bin of drawer 16.

If the printer runs out of tickets, the computer delays for ten seconds trying to advance a ticket from the hopper. If the hopper switch 200 is not activated within this interval of time (either there are no more tickets or there is a jam), a message is displayed stating "check paper".

A linear power suppply 278 and a switcher power supply 280 are used with the present printer due to the differing requirements of various portions of the printer apparatus. The linear supply 278 is used for the stepper motors, hopper motors, the head, the feed motor, and the driver board logic. The switcher supply 280 is used for everything else. The switcher supply 280 powers the computer logic, the keyboard, the LCD display, the bar code reader-scanner, and also the tray (sorter) driver motor as well.

14. TOP OF FORM ADJUSTMENT

The printer mechanism of the present invention, as before mentioned, utilizes an electromechanical switch 206 for the so-called "top of form" position adjustment. When the leading edge of the form, i.e., ticket 26, activates the switch, the printer controller 266 causes the ticket 26 to advance an additional 0.280 inch to the top of form position. The printer control program (software) causes the item feed motor 122 to step the form to the correct position. The displacement of the stepper feed motor 122 versus the item feed is 0.009 inch per step. Thus, 0.28 inch divided by 0.009 inch is approximately "31 steps". When the printer mechanism is first turned on, a default value of 31 steps is produced and saved in the printer memory 270. As earlier described, the operator thereafter enters any desired value to provide a ready reference for the actual value after which the stack of tickets can be fed and printed. Two independent sets of default values are available to the operation. One set for manual operation and another set for automatic operation.

Figure 10:
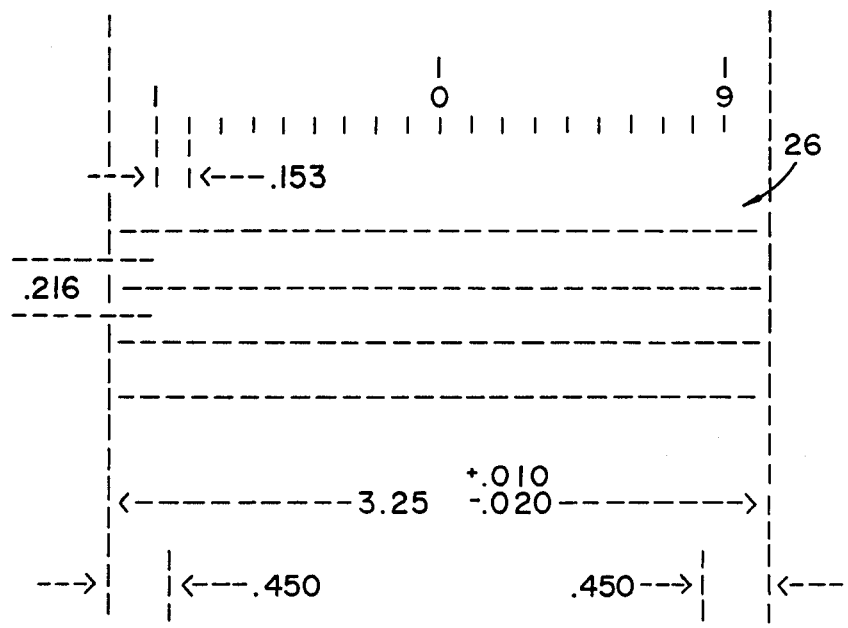
FIG. 10 is a symbolic representation of print head and reader-scanner positional movements relative to the ticket item.
Figure 11:
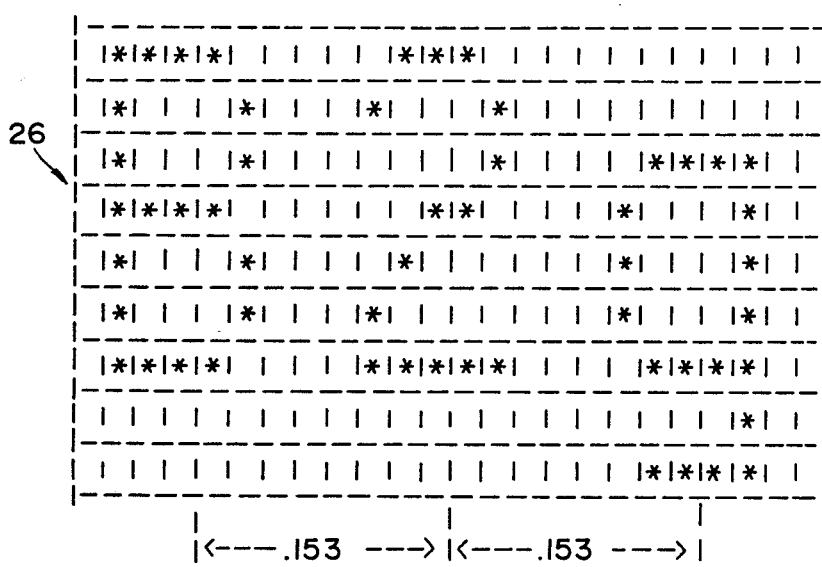
FIG. 11 is a diagram (not to scale) of the character field as employed with the invention.
Figure 12:
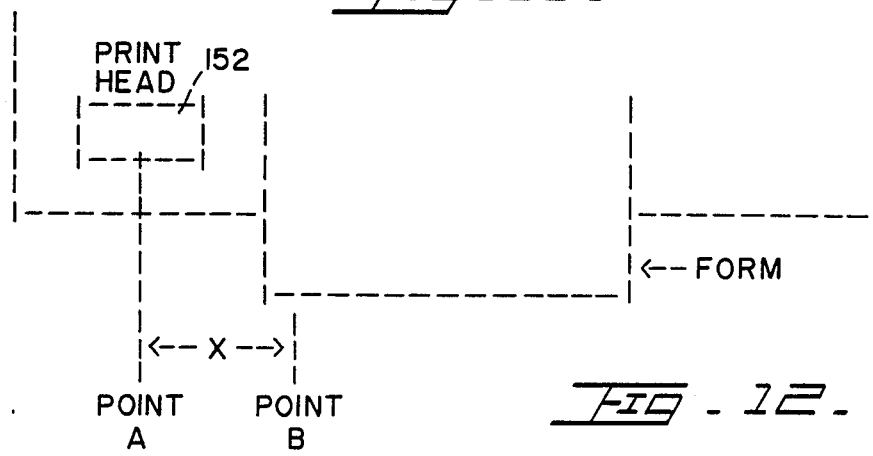
FIG. 12 is a print head timing diagram for the present invention.

As set forth in the diagram of FIG. 10, the ticket item 26 is 3.28 inches wide and 9.00 inches long. Printing is accomplished from side to side of the long dimension in 19 columns with 0.153 inches between columns. The character field consists of eight columns by nine rows of dot spaces, as shown in FIG. 11. Five columns are used for the character and three columns are used for the spaces therebetween. The characters are positioned on 0.153 inch centers. The print head control has logic seeking capabilities so that the control program returns the print head assembly 128 carrying the print head 152 to a "home" position (as shown in FIG. 12) after the last character of a line has been printed.

The electromechanical print head position sensors 182-184 are located in the printer and adjusted such that the movement of the print head 152 signals the computer 268 when the print head 152 is precisely on top of the first row of dots that belong to the first column on the ticket 26. At this moment, the computer activates the print head and prints on the first row of dots. The rest of the dots are printed keeping track of time. When the last row of dots is printed, the computer 268 via the respective head position sensor reverses the direction of head motor 168. At the moment the print head 152 passes through point "B", in FIG. 12, the sensor indicates to the computer 268 to advance the head an additional distance to position the head to the "home" position as indicated at point "A". The print cycle is now ready to begin again.

SUMMARY

There has thus been described a new, novel, and unobvious printer mechanism wherein a single turnaround document is employed both first as an initial repository for intelligible, human readable data and thereafter by comparison of document data with memory data stored in the printer or real time data fed to the printer from an external source, as a final instrument for generating diagnostic information, billing information, or data summaries for use in statistical plotting and similar environmental studies.

What we claim is:

1. Automatic printing apparatus (10) for use with a plurality of sheet items (26), each said sheet item (26) initially bearing machine and human readable data, each said sheet item initially being employed to identify and accumulate individual, original data and thereafter being reemployed as a final repository for additional data; said apparatus having:

moving means (54) for moving each said sheet item (26) in an initial direction and path of movement from an input hopper (20) to a data reading and printing station (128) including printing means (152) and then into output means (22), scanning and reading means (186) for scanning and reading said original data on each said item (26), and memory storage means (270) coupled to said scanning and reading means (186) for storing said data from each of said items (26), the improvement comprising:

said memory storage means (270) also being coupled to an external source of data (S-Plus); and said output means (22) comprising a plurality of output hoppers (22, 24) arranged within a movable drawer (16) in said printing apparatus, and said hoppers (22, 24) are movable within said drawer from side to side transverse to the direction of item movement in response to said control output;

comparing means (268, 270) for comparing said scanned original data from each of said items (26) with stored data received from said external source of data (S-Plus) and for obtaining a comparison result;

data processing means (268) coupled to said external source of data and also to said memory storage means (270) and to said scanning and reading means (186) for interpreting said comparison result to provide a control output (276) for controlling the position of said output means (22, 24); and said printing station (128) being coupled to said data processing means (268) and responsive to said control output for acknowledging said comparison result and for causing said printing means (152) to print on said item (26), as the result of said comparison, the additional data inputted to said data processing means (268) from said external source.

2. The printing apparatus (10) in accordance with claim 1 wherein said sheet item moving means (54) includes reversing means (84) for selectively reversing the direction of movement of said item (26) effective to turn said item in a direction opposite to the initial direction of movement into one of the output hoppers (22, 24).

3. The printing apparatus (10) in accordance with claim 2 wherein said reversing means (84) comprises operator controlled means (98) for causing said item (26) either to exit said apparatus directly to the operator, or to turn back upon itself and to move into one of said output hoppers (22, 24).

4. The printing apparatus (10) in accordance with claim 1 wherein said scanning and reading means (186) is a unitary, demountable replaceable assembly.

5. The printing apparatus (10) in accordance with claim 4 wherein said scanning and reading means (186) further includes latching and unlatching means (188, 190) for mounting and dismounting the item scanning and reading means (186) of said assembly.

6. The printing apparatus (10) in accordance with claim 1 further including output hopper control means (276) for moving said items (26) selectively into an accept hopper (22) or a reject hopper (24) subsequent to printing on said items the data output resulting from the comparison between the original data on each item (26) and the inputted data.

7. The printing apparatus (10) in accordance with claim 1 wherein said comparing means (268, 270) is constructed and arranged to operate with said items (26) arranged in random sequence.

8. The printing apparatus (10) in accordance with claim 1 wherein said automatic printing apparatus (10) further includes key pad means (36) for entering numeric data into said printing means.

9. The printing apparatus (10) in accordance with claim 1 wherein said machine and human readable original data is provided by an adhesive means (262) bearing identifying information said adhesive means initially secured to each sheet item (26) prior to the start of any printing operation, and each said adhesive means (262) bears thereon at least two sets of data.

10. The printing apparatus (10) in accordance with claim 1 wherein said comparing means (268) cooperates with said moving means (54) for ejecting said item (26) from the apparatus responsive to a predetermined result of the comparing means (268), to indicate that the original data on the item failed to correspond to the additional data stored in said memory (270).

11. The printing apparatus (10) in accordance with claim 1 wherein said printing means (152) and said scanning and reading means (186) are structured as a unitary assembly and are provided with a single drive means (168, 174) to which they are responsive.

12. The printing apparatus (10) in accordance with claim 11 wherein said printing means (152) is movable (174) orthogonal to the path of movement of said document (26).

13. The printing apparatus (10) in accordance with claim 1 wherein said printing station (128) is constructed and arranged (174) for bidirectional movement, so as to print from left to right and from right to left with respect to said item (26).

* * * * *